United States Patent [19]

Giannuzzi et al.

[11] Patent Number: 5,800,107
[45] Date of Patent: Sep. 1, 1998

[54] SELF-TAPPING, SCREW-TYPE MASONRY ANCHOR

[76] Inventors: Louis N. Giannuzzi; Anthony C. Giannuzzi, both of 28 Doral Farm Rd., Stamford, Conn. 06902

[21] Appl. No.: 634,824

[22] Filed: Apr. 19, 1996

[51] Int. Cl.$^6$ ............................................. F16B 25/00
[52] U.S. Cl. ..................................... 411/386; 411/411
[58] Field of Search ........................ 411/386, 411–416, 411/424, 426; 606/73

[56] References Cited

U.S. PATENT DOCUMENTS

| | | | |
|---|---|---|---|
| Re. 626 | 11/1858 | Sloan | 411/386 |
| 113,006 | 3/1871 | Bidwell | 411/386 |
| 1,229,560 | 6/1917 | Whiteman | 411/411 |
| 2,382,019 | 8/1945 | Miller | 411/386 |
| 2,512,082 | 6/1950 | Bainbridge | 411/416 |
| 4,527,932 | 7/1985 | Onasch | 411/411 |
| 4,799,844 | 1/1989 | Chuang | 411/414 |
| 4,861,210 | 8/1989 | Frerejacques | 411/411 |
| 5,188,496 | 2/1993 | Giannuzzi | 411/411 |
| 5,544,993 | 8/1996 | Harle | 411/411 |

FOREIGN PATENT DOCUMENTS

| | | | |
|---|---|---|---|
| 402286903 | 11/1990 | Japan | 411/426 |

*Primary Examiner*—Rodney M. Lindsey
*Assistant Examiner*—Gary Estremsky
*Attorney, Agent, or Firm*—Michael Ebert

[57] ABSTRACT

A self-tapping, screw-type anchor capable of being turned into a hole drilled in masonry whose hardness renders the wall of the hole highly resistant to a tapping action. The anchor includes a thread forming a helical ridge on the root of the anchor, the thread having a profile defining a pair of opposing curvilinear flanks rising above the root and converging toward a crest. The curvature of the flanks which is preferably hyperbolic, creates a crest having a small included angle adapted to penetrate the wall of the hole, the crest being supported on a relatively broad base that merges with the root to firmly secure the thread thereto and thereby prevent deformation or mutilation of the thread as the anchor is being turned into the hole.

10 Claims, 3 Drawing Sheets y = Vertical Asymptote
x = Horizontal Asymptote
a = Distance from the Vertical Asymptote
   to where the curve crosses the x axis
p = a
F = foci

SELF-TAPPING, SCREW-TYPE MASONRY ANCHOR

BACKGROUND OF INVENTION

1. Field of Invention

This invention relates generally to self-tapping, screw-type anchors adapted to be turned by a torque tool into a hole drilled in a masonry structure to support an object on the masonry, and more particularly to a masonry anchor having a helical thread capable of penetrating the wall of a hole drilled in hard masonry without the thread being deformed or mutilated.

2. Status of Prior Art

It is frequently necessary to secure fixtures, brackets, channel pieces and other more or less heavy objects to the surface of a masonry structure formed of concrete, brickwork or other masonry material. These objects are attached to the masonry structure by masonry anchors.

Concrete is made by mixing cement and an aggregate of inert particles of varying size, such as a combination of sand or broken stone screenings with gravel. Compressive strength is generally accepted as the principal index to the structural quality of concrete. Mixtures for concrete masonry structures, such as walls and partitions, ordinarily employ aggregates having a maximum size of one half inch. Masonry brick is usually formed from clay, shale or pumice hardened by heat. Bricks for this purpose are available in different degrees of hardness, depending on the material used in making the brick.

The patent to Ernst, U.S. Pat. No. 3,937,119 discloses a self-tapping, screw-type metal anchor which has a sharp-crested helical male thread surrounding the shank of the anchor, the convolutions of the thread running the length of the shank. This male thread, when the anchor is turned into a hole drilled in masonry, functions to tap the wall of the hole to create an internal female thread in the wall. Since the male thread on the shank mates with the female wall thread, the anchor is then resistant to pull-out forces which seek to back the anchor out of the hole.

Also disclosing a self-tapping, screw-type anchor for masonry is the Giannuzzi U.S. Pat. No. 5,188,496 in which the helical thread forms a ridge on the root or shank so that the crests on the series of thread convolutions decrease progressively in diameter from the leading end to the trailing end of the root to create a reverse taper. This anchor is fabricated of a metal whose hardness is such that when the anchor is turned into a hole drilled in masonry, the thread is then abraded and worn by the wall of the hole to effectively erase the taper.

The concern of the present invention is with a self-tapping, screw-type anchor capable of being turned into masonry whose hardness is such as to render the wall of the hole highly resistant to a tapping action.

As pointed out in the patent to Godsted U.S. Pat. No. 4,439,077, when masonry is constituted by concrete having an aggregate of relatively hard material, such as granite, then a conventional self-tapping, screw-type metal anchor is unable either to penetrate the wall of the hole drilled in the concrete or it requires a very large torque force to do so, thereby making it difficult to turn the anchor into the drilled hole.

Godsted explains that in order to provide a screw-type anchor which is effective in hard aggregate concrete or masonry, the helical thread must have sharp crests to cut into the wall of the drilled hole. But if the crests on the thread are sharp, then the base of the thread will be narrow and the thread will be weakly secured to the root of the anchor. As a consequence, when an anchor having a thread of this type is turned into the hole drilled in hard masonry, the weak thread may then be bent or mutilated, or even sheared off.

To overcome this drawback, Godsted provides a thread having a triangular profile defined by straight flanks converging toward a pointed crest, with an included angle in a range of 50° to 60°. This included angle represents a compromise, for while the crest is not as sharp as that produced by an included angle in a range of 30° to 40°, it results in a relatively broad base supporting the crest. Hence the thread has sufficient strength and durability to survive installation in hard concrete. But in creating this stronger thread, Godsted sacrifices its sharpness and its ability to cut into hard concrete without the need for a large torque driving force.

Of particular background interest is the self-tapping screw for use in a hole drilled in plastic disclosed in the Onasch et al. U.S. Pat. No. 4,525,932. In this patent, the thread forms a helical ridge on the root of the screw and the flanks of this thread are so curved as to form a first circular arc having a first radius, and a second circular arc having a second radius different from the first radius.

This special thread profile in the Onasch et al. patent is designed to prevent the screw thread from shearing off in the course of being turned into the hole drilled in the plastic body, for the rounded transitions between the flanks and root of the thread result in an increase in the inherent strength of the screw.

Also of background interest is the self-tapping screw fastener disclosed in the Yamashiro U.S. Pat. No. 4,536,117 which is adapted to be turned into a hole drilled in sheet metal.

The helical thread shown in Yamashiro has a double angle. The triangular crest portion of the thread has a relatively small included angle and a sharp edge so that it cuts easily into the sheet metal, whereas the triangular base portion of the thread has a relatively large included angle to provide a broad base to strengthen the thread.

This double-angle triangular profile results in an abrupt transition between the crest portion and the base portion of the thread. This is disadvantageous in the context of tapping the wall of a hole drilled in masonry in which the wall tapped by the male thread of the anchor must have formed therein a corresponding female thread to render the anchor resistant to pull out forces.

SUMMARY OF INVENTION

In view of the foregoing, the main object of this invention is to provide a self-tapping, screw-type masonry anchor capable of being turned into a hole drilled in the masonry whose hardness is such as to render the wall of the hole highly resistant to tapping.

More particularly, an object of this invention is to provide an anchor of the above type whose thread which forms a helical ridge on the root of the anchor has a crossectional profile defining a sharp crest which cuts into the wall of the hole, the crest leading to an expanding base which merges with the root of the anchor, whereby the thread is durable and strong and will therefore not be deformed or mutilated when the anchor is turned into a hole drilled in hard masonry.

A significant feature of a masonry anchor in accordance with the invention is that the crossectional profile of its helical thread is defined by curvilinear flanks that converge toward a crest to create a sharp cutting edge supported on a broad base, thereby firmly securing the thread on the root of the anchor.

Among the advantages of an anchor in accordance with the invention are the following:

A. The flanks of the thread preferably follow the contour of a hyperbolic curve, thereby producing a sharper crest and a broader base that is achievable with an anchor whose thread has a triangular profile, or a profile having other flank curvatures, such as than of a circular arc.

B. The anchor requires less torque to drive the anchor in a hole drilled in hard concrete that is required to install prior art anchors and therefore is not subject to torsional forces that might fracture the anchor.

C. The anchor may be mass-produced at relatively low cost.

Briefly stated, these objects are attained by a self-tapping, screw-type anchor capable of being turned into a hole drilled in masonry whose hardness renders the wall of the hole highly resistant to a tapping action. The anchor includes a thread forming a helical ridge on the root of the anchor, the thread having a profile defining a pair of opposing curvilinear flanks rising above the root and converging toward a crest. The curvature of the flanks which is preferably hyperbolic, creates a crest having a small included angle adapted to penetrate the wall of the hole, the crest being supported on a relatively broad base that merges with the root to firmly secure the thread thereto and thereby prevent deformation or mutilation of the thread as the anchor is being turned into the hole.

BRIEF DESCRIPTION OF DRAWINGS

For a better understanding of the invention, as well as other objects thereof, reference is made to the following detailed description of the invention to be read in conjunction with the accompanying drawings in which.

DESCRIPTION OF INVENTION

Prior Art

A conventional self-tapping, screw-type masonry anchor is provided with a helical male thread running the length of the shank, the rear end of the shank being joined to a head engageable by a torque tool for turning the anchor into a hole drilled in masonry. This tool may be a hand wrench or screwdriver, or a power-operated tool.

The raised male thread on the root or shank of the anchor has an outer diameter slightly greater than the diameter of the drilled hole. Hence when the anchor is turned into the drilled hole, the male thread then cuts a complementary female thread in the wall of the hole which serves to secure the anchor within the hole and to prevent it from being pulled out.

The present invention is addressed to the problem which arises when the anchor is installed in a hole drilled in hard masonry which is highly resistant to a tapping action. The thread of the anchor must nevertheless be capable of cutting into the hard wall of the hole drilled in masonry, and in order to do so, that the thread must have a sharp cutting edge or crest.

Figure 1:
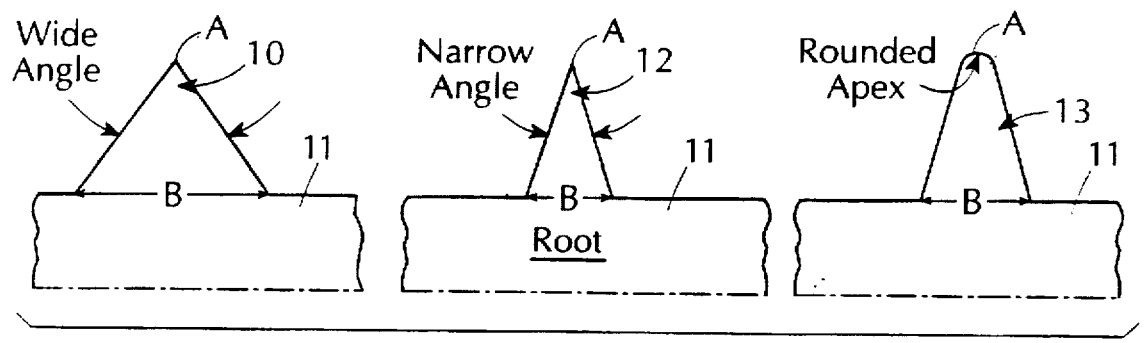
FIG. 1 schematically illustrates three different conventional anchor thread profiles.

However, when the helical male thread 10 of a conventional self-tapping anchor, as shown in the left-side section of FIG. 1 has a wide-angle triangular crossectional profile, then the included angle of the apex A or crest of the thread exceeds 60 degrees and the ability of the crest to penetrate a hard masonry wall is impaired. The base B of the thread 10 which merges with the root 11, because of the wide angle, is broad.

Because crest A of thread 10 is supported on a broad base B which merges with the root 11 of the anchor, the thread is strong. But the wide angle of the thread 10 renders it incapable of easily penetrating hard masonry, or it may require a very large driving torque to do so. A large driving torque applies a considerable torsional force to the anchor which may fracture its structure. Hence though thread 10 is strong, the anchor is not acceptable for hard masonry.

The helical thread 12 of the conventional masonry anchor shown in the center section of FIG. 1 has a narrow angle triangular profile and crest A thereof is therefore sharp and capable of penetrating hard concrete. But the base B of the narrow angle thread 12 is narrow, for its width is less than half the width of base B of thread 10. Crest A of thread 12 is therefore not strongly supported, and while the thread can cut into hard masonry, in the course of being turned into the hole drilled in this masonry, the thread may become bent, or deformed, or otherwise mutilated, and the anchor will not be properly secured in the hole.

In the right-side section of FIG. 1, the conventional anchor thread 13 shown therein represents a compromise between the wide angle and narrow angle threads shown in the same figure.

The base B in thread 13 is broader than the narrow base of thread 12 and is narrower than the broad base of thread 10. And thread 13 has a rounded crest A whose included angle is greater than the sharp crest of thread 12 and smaller than the wide angle crest of thread 10. But while thread 13 is fairly strong, it is incapable of cutting hard concrete without the application of a very large torque.

The Basic Invention

In a self-tapping, screw-type anchor in accordance with the invention, the thread has a crossectional profile which imparts to the crest of the thread a small included angle so that it is capable of cutting hard masonry, and a broad base supporting the crest which merges with the root of the anchor whereby the thread is strong and is able to withstand the forces to which the anchor is subjected as it is being turned into a hole drilled in hard masonry, which forces seek to mutilate or break off the thread.

Figure 2:
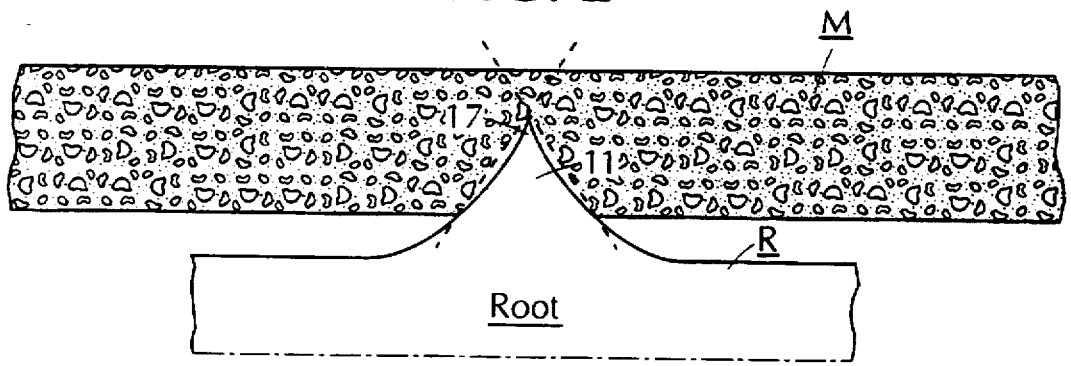
FIG. 2 schematically illustrates an anchor having a thread profile in accordance with the invention.
Figure 3:
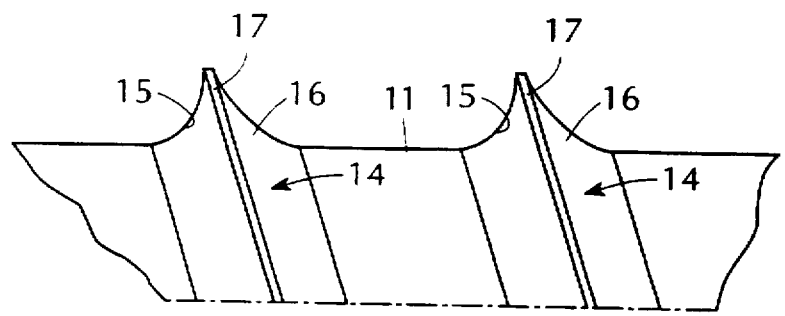
FIG. 3 is a perspective view of the thread profile.

As shown in FIGS. 2 and 3 in connection with a hole drilled in hard masonry M, such as concrete, having a hard granite aggregate, an anchor in accordance with the invention which is turnable into this hole, has a thread 14 which forms a helical ridge on the root R of the anchor. Thread 14 has a crossectional profile defined by a pair of opposing curvilinear flanks 14 and 16 which rise upwardly from root R to converge at crest 17.

Flanks 15 and 16 of thread 14 each have the contour of a plane curve which is the graph of an equation that determines the shape of the curve. The radius of this curve increases in accordance with the equation from the crest to the base of the flank. This rules out a curve which is an arc of a circle, for in this curve the radius remains constant.

In considering the profile of the thread of a masonry anchor, it is helpful to divide the profile into a crest zone $Z_1$, an intermediate zone $Z_2$, and a base zone $Z_3$, for the cutting capability of the thread depends on the included angle of the crest zone, and the durability and strength of the thread depends on the support provided for the crest zone through the intermediate zone by the base zone.

Figure 4:
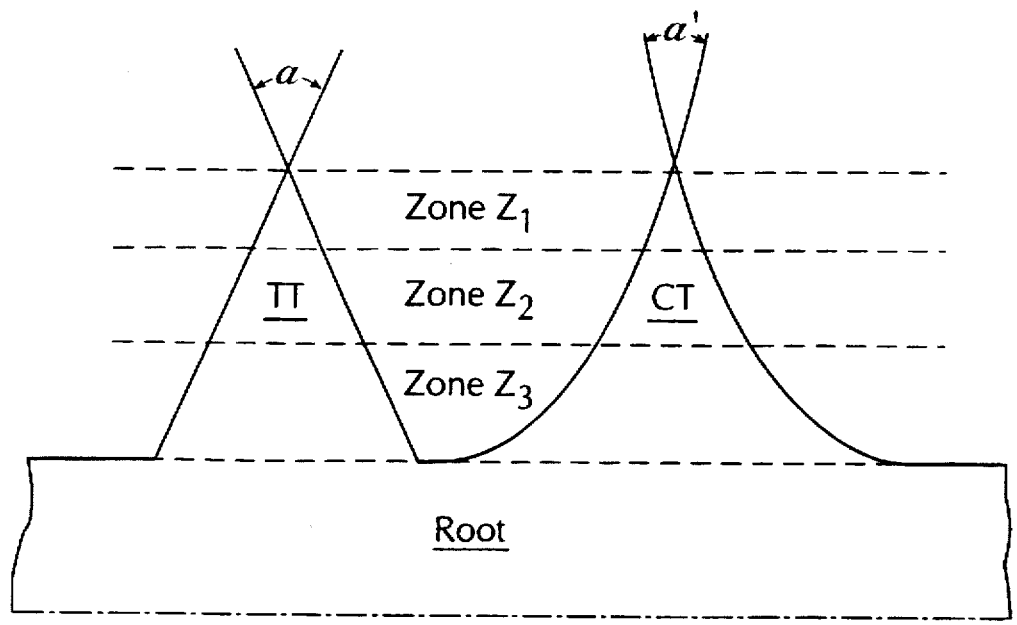
FIG. 4 shows on the same anchor root a prior art thread and a thread in accordance with the invention.

In order to explain the significant distinctions between a masonry anchor thread having a wide angle triangular profile, and a thread in accordance with the invention whose profile is defined by a pair of opposing curvilinear flanks, FIG. 4 schematically illustrates both the profile of a prior art wide-angle triangular thread TT, and a thread CT in accordance with the invention having curvilinear flanks. This figure shows these threads on a common root and having the same height.

Both threads TT and CT are divided into crest, intermediate and base zones $Z_1$, $Z_2$ and $Z_3$. The included angle "a" of the crest zone $Z_1$ of the wide angle triangular thread TT is necessarily large, hence this thread, though it has a broad base zone and is strong, it is incapable of easily penetrating hard masonry.

We shall assume by way of example that the profile of thread CT whose opposing flanks are curvilinear, each having a plane curve whose radius increases progressively from the crest to the base of the thread. These curves in the crest zone $Z_1$ meet at the apex of the thread and then gradually separate to an increasing degree so that the crest zone exhibits an included angle "a'". This angle is small and affords a relatively sharp cutting edge suitable for hard masonry.

In the intermediate zone $Z_2$, the curved flanks progressively further separate from each other, and in base zone $Z_3$ the separated flanks flare out, as in an exponential horn, to create a broad base that merges with the root of the anchor.

In triangular thread TT there is an abrupt transition from the thread to the root, whereas in thread CT the transition is gradual and along a continuous curved path that flows into the root, thereby enhancing the strength of this thread.

But while both threads are strong, only the sharper thread CT is capable of easily penetrating hard masonry, and this thread as the anchor is turned into a drilled hole will not be deformed or sheared off.

Figure 5:
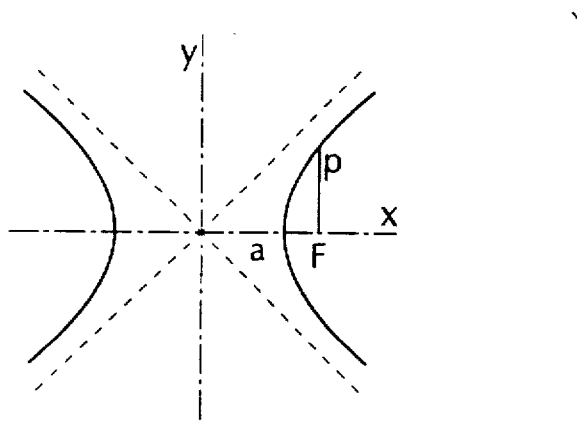
FIG. 5 shows a hyperbolic curve whose contour determines the curvature of the flanks in the thread profile of a preferred embodiment of a screw-type anchor in accordance with the invention.

The preferred curvature of the curvilinear flanks of the anchor thread is hyperbolic. A hyperbola is a plane curve, as shown in FIG. 5, having two branches formed by the intersection of a plane with both halves of a right circular cone at an angle to the axis of the cone.

A hyperbola is defined by the following equation:

$$\frac{X^2}{a_2} - \frac{Y^2}{b_2} = 1$$

The opposing flanks of the anchor thread are those of an equilateral hyperbola in which a=b. It is therefore defined by the equation $X^2 - Y^2 = a^2$.

While a thread having flanks whose contour follows a hyperbolic curve is the preferred profile of the thread, as pointed out above, other curvatures based on a plane curve equation may be used which produce a relatively sharp crest and a broad base merging along a curved path with the root of the anchor. A thread having such a profile is superior in cutting ability and strength to a thread having a triangular profile or a profile in which the flanks have a circular arc form.

Masonry Anchor Embodiments

An elementary embodiment of a masonry anchor in accordance with the invention is that shown in FIG. 3 in which the diameter of the shank or root 11 is uniform throughout its length and the exterior diameter of the convolutions of thread 14 having curvilinear flanks is also uniform throughout the length of the shank.

The diameter of the shank of this anchor is slightly smaller than that of the drilled hole and the outer diameter of the thread is slightly larger so that when the anchor is turned into the hole, it cuts a complementary female thread in the wall of the hole.

For certain applications, other embodiments of an anchor whose thread has curvilinear flanks have advantages over the embodiment shown in FIG. 3.

Figure 6:
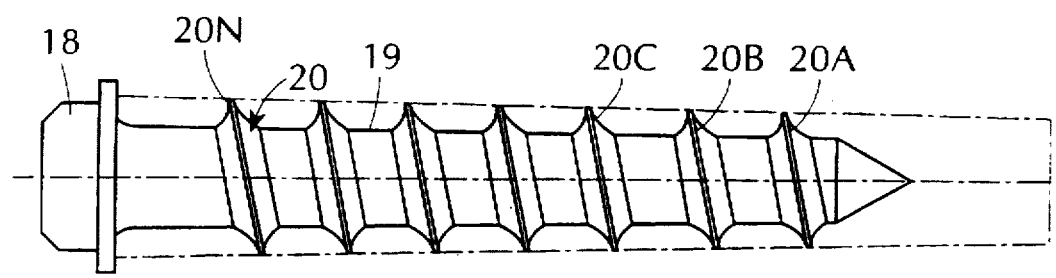
FIG. 6 shows a self-tapping, screw-type masonry anchor in an embodiment in which the exterior diameter of the helical thread increases progressively from the tip of the anchor to the head thereof.

In the embodiment shown in FIG. 6 a metal self-tapping, screw-type masonry anchor in accordance with the invention, is provided with a head 18 adapted to accept a torque tool to turn the anchor into a hole drilled in hard masonry. Extending from head 18 is a shank 19 which is gently tapered so that the diameter of the shank at its tip end is somewhat smaller than the diameter at its head end.

Formed on shank 19 which is the root of the anchor and extending along its length is a helical male thread 20 whose profile is such as to define opposing curvilinear flanks converging at a relatively sharp crest.

Hence in the FIG. 6 embodiment, the outer diameter of the screw thread increases progressively from the tip end to the head end of the tapered root on which the thread is mounted. This anchor configuration reduces the cutting load per thread convolution, as will now be explained.

The hole drilled in masonry has a uniform diameter slightly smaller than the outer diameter of the first convolution 20A of thread 20. Hence when the anchor is turned into the drilled hole, thread convolution 20A cuts a shallow helical groove in the wall of the hole. The second convolution 20B has a slightly greater outer diameter than the first convolution, and therefore cuts more deeply into the groove cut by the first convolution. The third convolution 20C cuts even more deeply into the groove, and so on with respect to the remaining convolutions.

The lead angle of the anchor thread and the pitch thereof is selected so that these parameters are appropriate not only to the hardness of the masonry for which the anchor is intended, but also to the power of the torque tool used to install the anchor as well as the required speed of installation.

The anchor is fabricated of a metal such as carbon steel, stainless steel or a similar high strength material which is resistant to corrosion resulting from contact with moisture and chemicals, such as alkalis, found in masonry structures. To enhance corrosion resistance, a corrosion resistant finish may be provided, such as a galvanized metal coating.

The anchor may be formed by machining a metal stock piece or by cold rolling through a die shaped to define the helical thread. The metal stock for this purpose must be plastically deformable.

Figure 7:
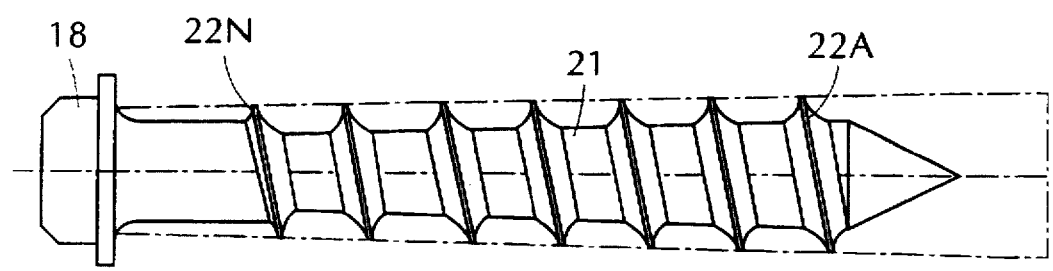
FIG. 7 shows an embodiment of the anchor in which the exterior diameter of the helical thread is progressively smaller from the tip of the anchor to the head thereof.

In the embodiment of the anchor shown in FIG. 7, the shank 21 of the anchor has a reverse taper, for the diameter of the shank increases progressively from the head end to its tip end. Hence the exterior diameter of the first thread convolution 22A is relatively large and the successive convolutions have progressively smaller diameters, the smallest of which is a slightly greater than the diameter of the drilled hole into which the anchor is turned.

This anchor which is suitable for hard concrete, reduces drag on the thread while it is being installed and has the same advantages as the reverse taper anchor disclosed in the previously described Giannuzzi U.S. Pat. No. 5,188,496.

Figure 8:
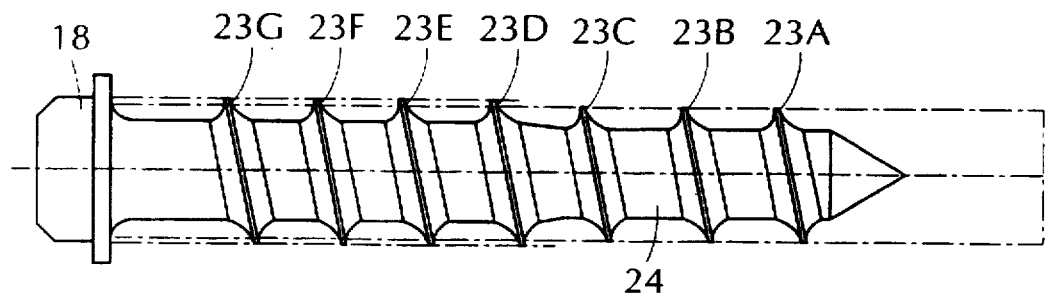
FIG. 8 shows an embodiment of the anchor in which the exterior diameter of the thread in the leading section thereof is constant and in which the exterior diameter of the thread in the trailing section is constant and greater than that of the leading section whereby the anchor has a stepped formation.

The embodiment of the anchor shown in FIG. 8 affords a stepped, two stage cutting action. Thus the convolutions 23A, 23B and 23C on the leading section of the shank 24 have the same outer diameter, and this is smaller than the constant outer diameter of the convolutions 23D to 23G on the trailing section of the shank.

The hole drilled in the masonry has a diameter slightly greater than the outer diameter of the thread in the leading section of the anchor. Hence when the anchor is turned into the drilled hole, it takes relatively little torque to cause the leading section to cut a shallow helical groove in the wall of the drilled hole. This shallow groove pre-cut in the wall of the hole makes it easier for the trailing section of the anchor whose outer diameter is greater, to cut more deeply into the shallow groove.

While there have been shown preferred embodiments of a self-tapping, screw-type anchor in accordance with the invention, it will be appreciated that many changes may be made therein without departing from the essential spirit of the invention.

We claim:

1. A self-tapping, screw-type anchor capable of being turned into a hole drilled in masonry whose hardness renders the wall of the hole highly resistant to a tapping action, said anchor comprising:

A. a head adapted to accept a torque tool for turning the anchor into the drilled hole;

B. a shank extending from the head to form the root of the anchor; and

C. a thread forming a helical ridge on the root, said thread having a crossectional profile defining a pair of opposing curvilinear flanks which rise from a base integral with the root and converge toward a crest, said flanks each having a plane curve contour creating a crest having a small included angle capable of penetrating the wall of the hole and a relatively broad base affording a strong support for the thread to prevent the thread from being deformed or mutilated as the anchor is turned into the hole, said plane curve contour having a radius which increases progressively from the crest to the base of the thread.

2. An anchor as set forth in claim 1, in which said plane curve is a hyperbolic curve.

3. An anchor as set forth in claim 2, in which the curve is an equilateral hyperbolic curve.

4. An anchor as set forth in claim 1, in which the anchor is made of a corrosion-resistant metal.

5. An anchor as set forth in claim 1, in which the metal is stainless steel.

6. An anchor as set forth in claim 1, in which the anchor is made of a plastically deformable metal that is cold rolled to create said thread.

7. An anchor as set forth in claim 1, in which said shank is tapered so that its diameter decreases progressively from the head end to the tip end of the shank, the outer diameter of the thread likewise decreasing progressively.

8. An anchor as set forth in claim 1, in which said shank is reversed tapered so that its diameter increases progressively from the head end to the tip end of the shank, the outer diameter of the thread likewise increasing progressively.

9. An anchor as set forth in claim 1, in which the shank is divided into a leading section and a trailing section of larger diameter, said leading section having a first series of thread convolutions thereon all having the same outer diameter, said trailing section having a second series of thread convolutions thereon having the same outer diameter which is greater than the diameter of the first series.

10. A self-tapping, screw-type anchor capable of being turned into a hole drilled in masonry whose hardness renders the wall of the hole highly resistant to a tapping action, said anchor comprising:

A. a head adapted to accept a torque tool for turning the anchor into the drilled hole;

B. a shank extending from the head to form the root of the anchor; and

C. a thread forming a helical ridge on the root, said thread having a crossectional profile defining a pair of opposing curvilinear flanks each having a contour in accordance with that of a plane curve equation whereby the flanks at the base of the thread rise upwardly in a continuous curved path from the root and converge toward a crest having a small included angle, said contour defining the plane curve having a radius which increases progressively from the crest to the base of the thread whereby the crest is capable of penetrating the wall of the hole and the base is relatively broad to afford a strong support for the crest to prevent the thread from being deformed or mutilated as the anchor is turned into the hole.

* * * * *